July 8, 1958   M. STANDISH ET AL   2,842,406
CONTROL IN AN APPARATUS FOR CONVEYING MATERIALS
Filed Nov. 18, 1955
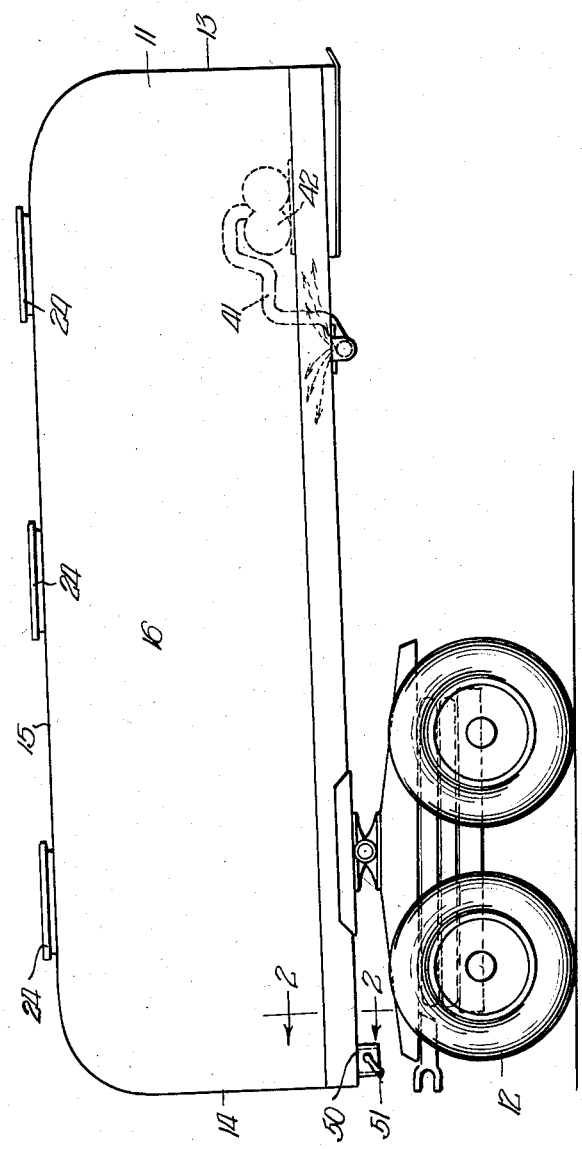
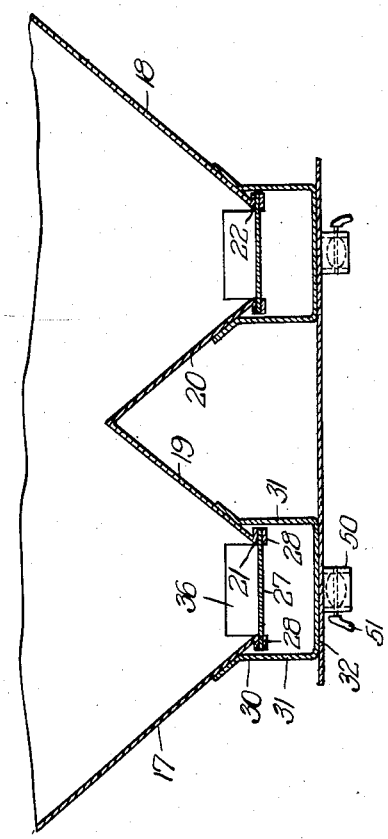
INVENTORS.
Myles Standish,
William D. Shadwick,
BY Wilkinson, Huxley, Byron + Hume.
ATTYS

United States Patent Office 2,842,406
Patented July 8, 1958

2,842,406

CONTROL IN AN APPARATUS FOR CONVEYING MATERIALS

Myles Standish, Omaha, Nebr., and William D. Shadwick, Council Bluffs, Iowa, assignors to Omaha Standard, Inc., Council Bluffs, Iowa, a corporation of Iowa Application November 18, 1955, Serial No. 547,778

2 Claims. (Cl. 302—29)

This invention relates to an apparatus for conveying material, and more particularly to a novel device for controlling the rate of discharge of pulverulent materials from a bin.

In devices of this type, the material is conveyed along an inclined porous medium which is supplied with air under pressure. The material is aerated so that its angle of respose is equal to or less than that of the angle of inclination of the porous medium, by a constant supply of air at an uniform pressure, through a channel or duct located below the porous medium. When so aerated, the material flows down the inclined surface of the porous medium to be discharged. In the past the rate of discharge has been controlled by a butterfly valve located in the path of the material at the discharge outlet.

It is an object of the present invention to provide a device in an aerator for controlling the rate of discharge of pulverulent materials.

It is a further object of the invention to provide a device for controlling the movements of material which is simple in construction and novel in operation.

It is another object of the invention to provide an indirect control for regulating the discharge of material in an aerator.

Further objects and advantages of this invention will become evident as the description proceeds and from an examination of the accompanying drawing which illustrates one embodiment of the invention and in which similar numerals refer to similar parts throughout the several views.

In the drawing:

Figure 1 is a side view of the device embodying the present invention, mounted on a mobile trailer.

Figure 2 is an enlarged view in cross section taken substantially along lines 2—2 of Figure 1.

Referring now to the drawings, there is shown a bin generally designated 11, in the form of a semi-trailer mounted upon wheels 12. Bin 11 is preferably fabricated of sheet steel and comprises a front wall 13, rear wall 14, top wall 15, and side walls 16. The bottom walls 17, 18 and the intermediate walls 19, 20 are inclined to provide a pair of bottom openings for the bin 21, 22. The top wall 15 is provided with several hatches 24, through which the material is loaded into the bin As shown more particularly in Figure 2, the bottom walls 17, 19 and 18, 20 take the form of two troughs with inclined walls. The troughs are identical so that a description of one will equally apply to the other.

A porous medium, such as a two-to eight-ply canvas belt 27, is drawn taut and clamped at the bottom opening 21 between side members 28 and the bottom walls of the bin. The porous medium extends along the entire length of the elongated opening 21 and supports the material at the bottom opening contained in the bin. In order to cause the material to flow, the porous medium is inclined at an angle greater than the angle of repose when aerated, either by elevating the entire trailer at the front end, or by a permanent tilted installation in the trailer.

An air duct 30, having side walls 31 and bottom wall 32, encompasses the porous medium 27 below the bottom opening. In this way, air under pressure in the duct passes uniformly through the porous medium into the material supported thereon.

The main air supply line 41 communicates with the air duct to supply air under pressure, for example, 0.8 pounds to 5 pounds per square inch. For supplying the air under pressure to lines 41, is a blower 42 driven by an internal combustion motor (not shown). A safety valve (not shown) may also be provided in the air supply line so that the air will be by-passed to atmosphere if the pressure goes about the setting.

As the air is supplied to the air duct 30, it passes uniformly through the porous medium to aerate the material in the bin. As the material is aerated, it flows down the porous medium 27, when inclined, and is discharged from the bin through discharge opening 36 in rear wall 14. A valve 50 for controlling the discharge for the material is mounted on the bottom wall 32 of the air duct 30 adjacent the discharge opening 36 in the bin. A handle 51 is provided on the valve for manual regulation. The valve communicates the duct with atmosphere and thereby vents the air in the duct when it is opened. By the valve the pressure of the air in the air duct 30 is effectively controlled, and as the air pressure is varied the rate of flow of the material on the porous medium is changed. In this way a simple indirect control for the discharge of the material is afforded.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

We claim:

1. In an apparatus for conveying material, a bin having a bottom opening, a porous medium at said bottom opening for supporting the material in said bin, an air duct for supplying air uniformly through said porous medium to aerate the material in the bin and cause it to flow on the inclined surface of the porous medium, said bin having an outlet opening at one end of said porous medium for discharging the material, means for supplying air under pressure to said air duct, and valve means located adjacent said outlet opening connected to said air duct for venting the air in said duct to atmosphere, whereby the flow of material on said porous medium is controlled.

2. An apparatus for conveying pulverulent material comprising a bin having a plurality of side walls for receiving pulverulent material, said bin having at least one elongate bottom opening, said bottom opening being defined by the downwardly converging walls depending from said side walls, an inclined porous medium at said bottom opening for supporting the pulverulent material in said bin, an air duct underlying said porous medium for supplying air to aerate the pulverulent material on said porous medium and cause it to flow on the inclined surface of the porous medium, said bin having an outlet opening at the lower end of said inclined porous medium for discharging the pulverulent material, means for supplying air under pressure to said air duct, and valve means located adjacent said outlet opening connected to said air duct for venting the air in said air duct to atmosphere whereby the flow of pulverulent material on said porous medium is controlled.

References Cited in the file of this patent

UNITED STATES PATENTS

| | | |
|---|---|---|
| 2,219,283 | Horn | Oct. 29, 1940 |
| 2,609,125 | Schemm | Sept. 2, 1952 |
| 2,657,100 | Weller | Oct. 27, 1953 |
| 2,774,637 | Sylvest | Dec. 18, 1956 |

FOREIGN PATENTS

| | | |
|---|---|---|
| 689,191 | France | May 26, 1930 |
| 727,020 | Germany | Sept. 17, 1942 |

UNITED STATES PATENT OFFICE

CERTIFICATE OF CORRECTION

Patent No. 2,842,406                                                          July 8, 1958

Myles Standish et al.

It is hereby certified that error appears in the printed specification of the above numbered patent requiring correction and that the said Letters Patent should read as corrected below.

Column 2, line 15, for "about" read -- above --.

Signed and sealed this 28th day of October 1958.

(SEAL)
Attest:

KARL H. AXLINE
Attesting Officer

ROBERT C. WAT
Commissioner of Pa